United States Patent
Ganzel

(10) Patent No.: US 7,052,094 B2
(45) Date of Patent: May 30, 2006

(54) VEHICLE BRAKE SYSTEM

(75) Inventor: Blaise J. Ganzel, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 10/613,444

(22) Filed: Jul. 3, 2003

(65) Prior Publication Data

US 2004/0004394 A1 Jan. 8, 2004

Related U.S. Application Data

(63) Continuation-in-part of application No. PCT/US02/14799, filed on May 10, 2002.

(60) Provisional application No. 60/393,798, filed on Jul. 3, 2002, provisional application No. 60/290,083, filed on May 10, 2001.

(51) Int. Cl.
*B60T 8/44* (2006.01)

(52) U.S. Cl. .............................. 303/114.1; 303/116.1; 60/548; 60/579

(58) Field of Classification Search .............. 303/113.1, 303/113.3, 114.1, 114.2, 115.1, 115.4, 116.1, 303/116.2, 116.1 X; 60/548, 547.1, 574, 60/575, 579, 579 X
See application file for complete search history.

(56) References Cited

U.S. PATENT DOCUMENTS

| | | | |
|---|---|---|---|
| 4,489,989 A | 12/1984 | Belart et al. | |
| 4,655,511 A | 4/1987 | Leiber | |
| 4,730,877 A | 3/1988 | Seibert et al. | |
| 4,787,685 A | 11/1988 | Klein | |
| 4,902,075 A | 2/1990 | Uno et al. | |
| 4,938,541 A | 7/1990 | Shaw et al. | |
| 4,995,677 A | 2/1991 | Matsuda et al. | |
| 5,106,170 A | 4/1992 | Matsuda et al. | |
| 5,112,115 A * | 5/1992 | Willmann et al. | 303/114.1 |
| 5,114,216 A | 5/1992 | Tsuda et al. | |
| 5,178,442 A | 1/1993 | Toda et al. | |
| 5,209,552 A | 5/1993 | Reinartz et al. | |
| 5,221,126 A | 6/1993 | Inoue | |
| 5,251,971 A | 10/1993 | Reinartz et al. | |
| 5,312,172 A | 5/1994 | Takeuchi | |
| 5,462,343 A | 10/1995 | Yoshida et al. | |
| 5,531,509 A | 7/1996 | Kellner et al. | |
| 5,544,948 A | 8/1996 | Schmidt et al. | |
| 5,567,021 A | 10/1996 | Gaillard | |

(Continued)

FOREIGN PATENT DOCUMENTS

JP 63301154 * 12/1988

(Continued)

*Primary Examiner*—Devon C. Kramer
(74) *Attorney, Agent, or Firm*—MacMillan, Sobanski & Todd, LLC

(57) ABSTRACT

A vehicle brake system includes a master cylinder having a housing defining a bore therein. A boost piston and a primary piston are slidably disposed in the bore. The master cylinder has a boost chamber defined at least in part by the boost piston and the housing. The system further includes a source of pressurized fluid and a boost valve operable to supply fluid from the source of pressurized fluid to the boost chamber for advancing the boost piston and the primary piston in the master cylinder. According to one aspect of the invention, the boost valve is housed in the boost piston. According to another aspect of the invention, the brake system includes a switchable travel rate feature. According to yet another aspect of the invention, the master cylinder includes a jump in feature. Additional features of the invention are also described herein.

19 Claims, 7 Drawing Sheets

U.S. PATENT DOCUMENTS

| | | |
|---|---|---|
| 5,658,057 A | 8/1997 | Ohnuma et al. |
| 5,667,285 A | 9/1997 | Seetharaman et al. |
| 5,673,979 A | 10/1997 | Kuromistsu et al. |
| 5,884,985 A | 3/1999 | Ganzel et al. |
| 5,887,954 A | 3/1999 | Stainer et al. |
| 5,941,608 A | 8/1999 | Campau et al. |
| 6,007,160 A | 12/1999 | Lubbers et al. |
| 6,053,582 A | 4/2000 | Ganzel |
| 6,183,049 B1 * | 2/2001 | Oka et al. ................ 303/114.1 |
| 6,183,050 B1 | 2/2001 | Ganzel |
| 6,196,641 B1 * | 3/2001 | Oka et al. ................ 303/114.1 |
| 6,206,484 B1 | 3/2001 | Ganzel |
| 6,273,526 B1 * | 8/2001 | Wachi et al. ............ 303/114.1 |
| 6,415,605 B1 * | 7/2002 | Takasaki et al. ............... 60/548 |
| 6,513,884 B1 * | 2/2003 | Nishii et al. ............. 303/114.1 |
| 2002/0017820 A1 * | 2/2002 | Nishii et al. ............. 303/114.1 |

FOREIGN PATENT DOCUMENTS

| | | | |
|---|---|---|---|
| JP | 4135960 | * | 5/1992 |
| JP | 569818 | * | 3/1993 |
| JP | 11192935 | * | 7/1999 |
| JP | 11192937 | * | 7/1999 |
| JP | 11198796 | * | 7/1999 |
| JP | 11263214 | * | 9/1999 |
| WO | 99/00281 | | 1/1999 |

* cited by examiner

VEHICLE BRAKE SYSTEM

CROSS REFERENCE TO RELATED APPLICATIONS

This application is a Continuation-In-Part of International Application No. PCT/US02/14799, filed on May 10, 2002, which claims priority to U.S. Provisional Application No. 60/290,083, filed on May 10, 2001. This application also claims the benefit of U.S. Provisional Application No. 60/393,798 filed Jul. 3, 2002.

BACKGROUND OF THE INVENTION

This invention relates in general to vehicle brake systems, and in particular to boosted brake systems.

Vehicles are commonly slowed and stopped with hydraulic brake systems. These systems vary in complexity but a typical base brake system includes a brake pedal, a tandem master cylinder, fluid conduits arranged in two similar but separate brake circuits, and wheel brakes in each circuit. The driver of the vehicle operates the brake pedal which is connected to the master cylinder. When the brake pedal is depressed, the master cylinder generates hydraulic forces in both brake circuits by pressurizing brake fluid. The pressurized fluid travels through the fluid conduit in both circuits to actuate brake cylinders at the wheels to slow the vehicle.

Base brake systems also typically use a brake booster which is operated during braking to provide a force to the master cylinder which assists the pedal force created by the driver. The booster can be vacuum or hydraulically operated. A typical hydraulic booster senses the movement of the brake pedal and generates pressurized fluid which causes assisted actuation of the master cylinder. The pressure generated from the booster assists the pedal force acting on the pistons of the master cylinder which generate pressurized fluid in the conduit in fluid communication with the wheel brakes. Thus, the pressures generated by the master cylinder are increased. Hydraulic boosters are commonly located adjacent the master cylinder piston and use a valve to control the pressurized fluid applied to the booster.

Braking a vehicle in a controlled manner under adverse conditions requires precise application of the brakes by the driver. Under these conditions, a driver can easily apply excessive braking pressure thus causing one or more wheels to lock, resulting in excessive slippage between the wheel and road surface. Such wheel lock-up conditions can lead to greater stopping distances and possible loss of directional control.

Advances in braking technology have led to the introduction of Anti-lock Braking Systems (ABS). An ABS system monitors wheel rotational behavior and selectively applies and relieves brake pressure in the corresponding wheel brakes in order to maintain the wheel speed within a selected slip range to achieve maximum braking force. While such systems are typically adapted, to control the braking of each braked wheel of the vehicle, some systems have been developed for controlling the braking of only a portion of the plurality of braked wheels.

Electronically controlled ABS valves, comprising apply valves and dump valves, are located between the master cylinder and the wheel brakes. The ABS valves regulate the pressure between the master cylinder and the wheel brakes. Typically, when activated, these ABS valves operate in three pressure control modes: pressure dump, pressure hold, and pressure apply. The dump valves relieve brake fluid from their associated wheel brakes during the dump mode, and apply valves allow pressurized brake fluid into respective ones of the wheel brakes to increase pressure during the apply mode. Wheel brake pressure is held constant during the hold mode by closing both the apply valves and the dump valves.

To achieve maximum braking forces while maintaining vehicle stability, it is desirable to achieve optimum slip levels at the wheels of both the front and rear axles. During vehicle deceleration different braking forces are generally required at the front and rear axles to reach the desired slip levels. Therefore, the brake pressures should be proportioned between the front and rear brakes to achieve the highest braking forces at each axle. ABS systems with such ability, known as Dynamic Rear Proportioning (DRP) systems, use the ABS valves to separately control the braking pressures on the front and rear wheels to dynamically achieve optimum braking performance at the front and rear axles under the then current conditions.

A further development in braking technology has led to the introduction of Traction Control (TC) systems. Typically, valves have been added to existing ABS systems to provide a brake system which controls wheel speed during acceleration. Excessive wheel speed during vehicle acceleration leads to wheel slippage and a loss of traction. An electronic control system senses this condition and automatically applies braking pressure to the wheel cylinders of the slipping wheel to reduce the slippage and increase the traction available. In order to achieve optimal vehicle acceleration, pressurized brake fluid is made available to the wheel cylinders even if the master cylinder is not actuated by the driver.

During vehicle motion such as cornering, dynamic forces are generated which can reduce vehicle stability. A Vehicle Stability Control (VSC) brake system improves the stability of the vehicle by counteracting these forces through selective brake actuation. These forces and other vehicle parameters are detected by sensors which signal an electronic control unit. The electronic control unit automatically operates pressure control devices to regulate the amount of hydraulic pressure applied to specific individual wheel brakes. In order to achieve optimal vehicle stability, braking pressures greater than the master cylinder pressure should be quickly available at all times.

BRIEF SUMMARY OF THE INVENTION

This invention relates to a vehicle brake system. The vehicle brake system in accordance with the present invention includes a master cylinder having a housing defining a bore therein. A boost piston and a primary piston are slidably disposed in the bore. The master cylinder has a boost chamber defined at least in part by the boost piston and the housing. The system further includes a source of pressurized fluid and a boost valve operable to supply fluid from the source of pressurized fluid to the boost chamber for advancing the boost piston and the primary piston in the master cylinder. According to one aspect of the invention, the boost valve is housed in the boost piston. According to another aspect of the invention, the brake system includes a switchable travel rate feature. According to yet another aspect of the invention, the master cylinder includes a jump in feature. Additional features of the invention are also described herein.

Various objects and advantages of this invention will become apparent to those skilled in the art from the following detailed description of the preferred embodiment, when read in light of the accompanying drawings.

DETAILED DESCRIPTION OF THE INVENTION

Figure 1:
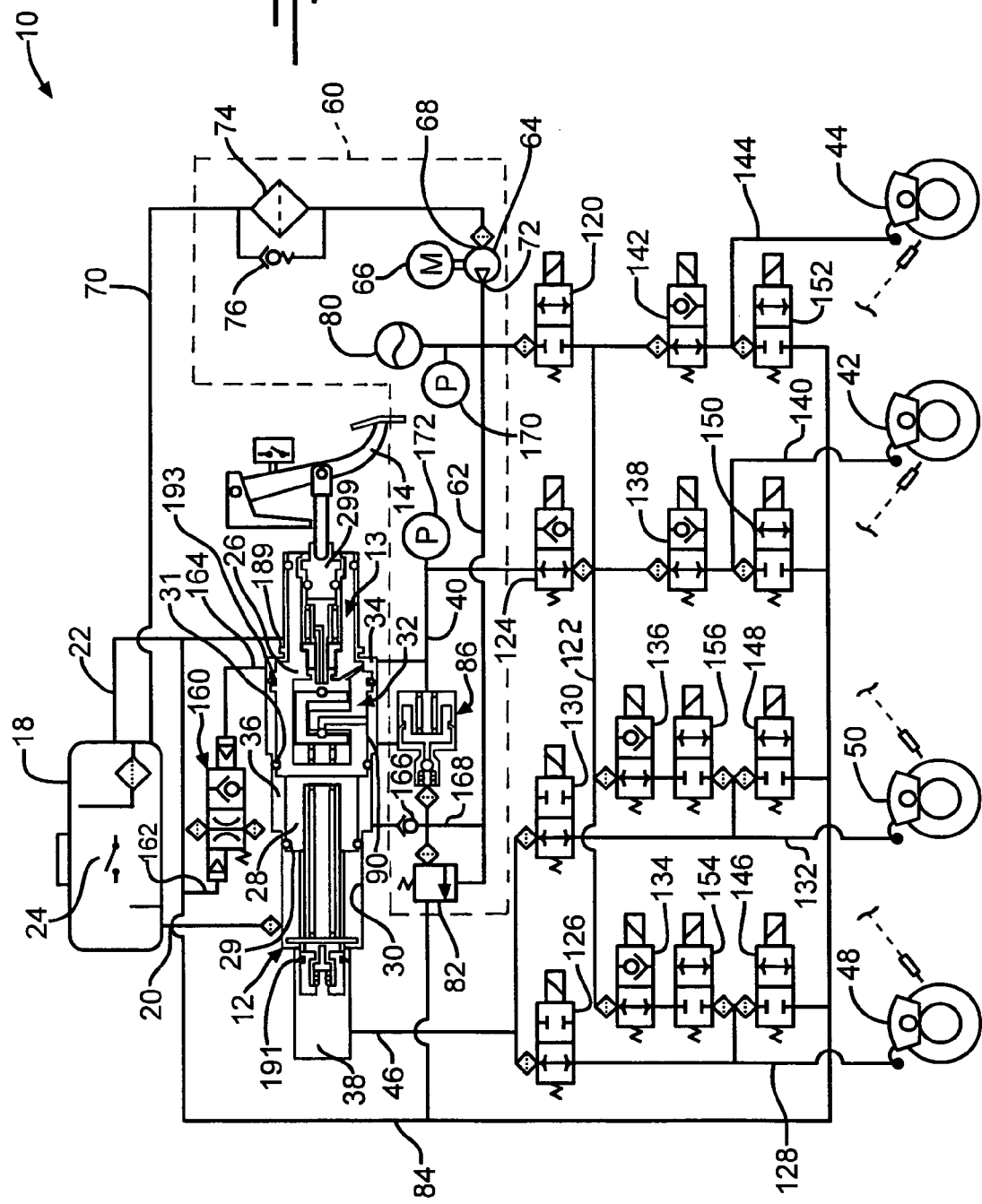
FIG. 1 is a hydraulic schematic view of a first embodiment of a brake system in accordance with the present invention.
Figure 2:
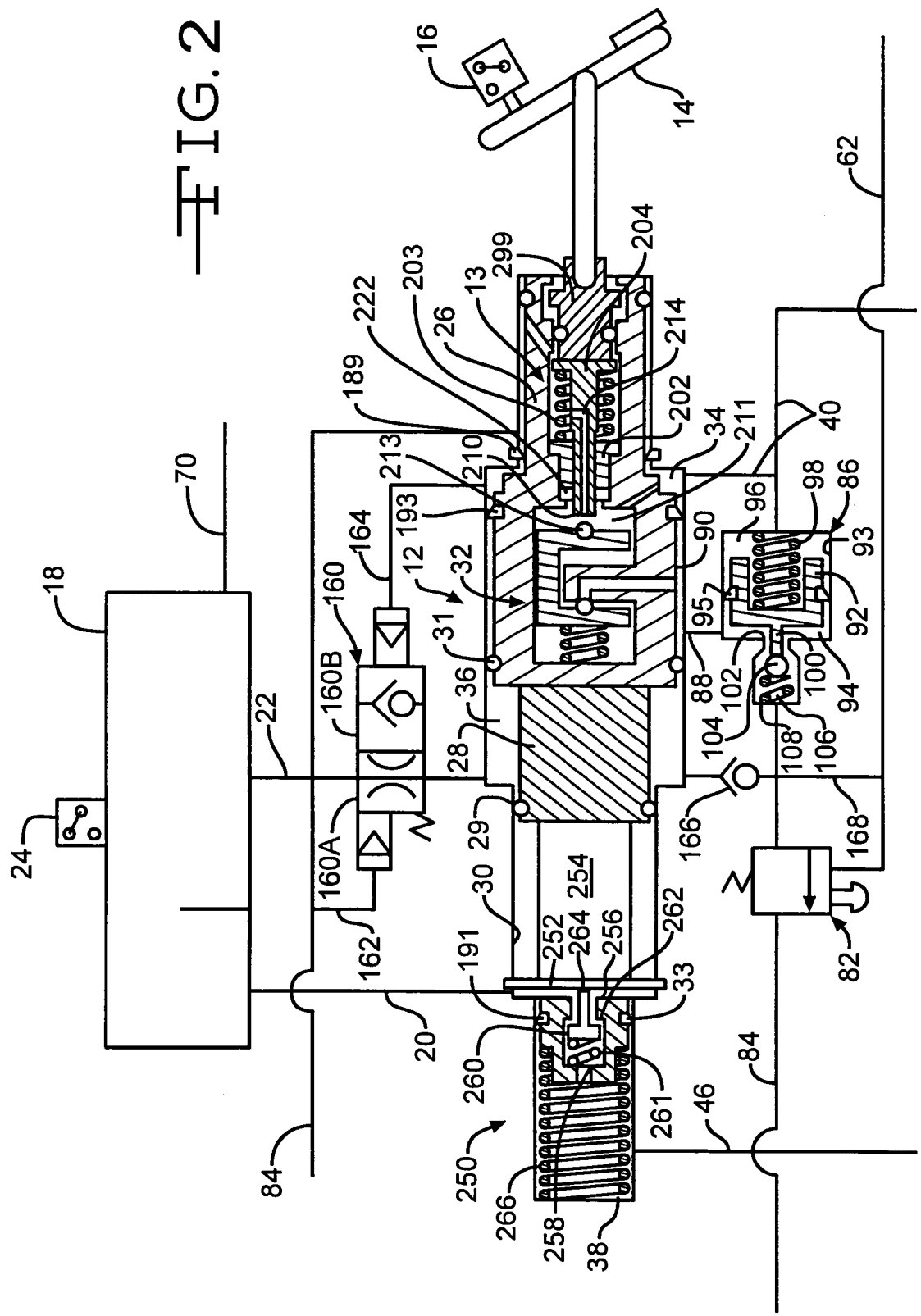
FIG. 2 is an enlarged schematic view of the master cylinder and boost valve of the brake system of FIG. 1.

Referring now to the drawings, there is schematically illustrated in FIGS. 1 and 2 a hydraulic schematic of a first embodiment of a brake system 10 in accordance with the present invention. The brake system 10 preferably includes a master cylinder, indicated generally at 12. If desired, the master cylinder 12 could be configured to be a tandem master cylinder. The master cylinder 12 generally pressurizes brake fluid for the brake system 10 when the operator of the brake system 10 depresses a brake pedal 14 coupled to the master cylinder 12. The brake system 10 may include a brake switch 16 connected to the brake pedal 14 to provide an input signal when the driver of the vehicle is depressing the brake pedal 14. A brake fluid reservoir 18 is in fluid communication with the master cylinder 12 via a pair of conduits 20 and 22. The reservoir 18 preferably holds a supply of brake fluid at or about atmospheric pressure. A reservoir switch 24 can be connected to the reservoir 18 for sensing the fluid level within the reservoir 18.

The brake systems of the present invention include various filters used in the flow paths of the conduits and fluid components. The filters are schematically indicated by a generally diamond shape having a broken line therein. It should be noted that the filters can be removed, added, or differently located.

As best shown in FIG. 2, the master cylinder 12 generally includes a boost piston 26 and primary piston 28 which are slidably disposed in a stepped bore 30 formed in a housing of the master cylinder 12. A boost valve, indicated generally at 32, is housed in the boost piston 26. Although the boost valve 32 is shown mounted in the boost piston 26, it should be understood that the boost valve 32 may be located elsewhere, such as remotely from the master cylinder 12. As shown in FIGS. 1 and 2, a boost chamber 34 is generally defined by the housing of the master cylinder 12, the stepped boost piston 26, and seals 189 and 193. The seals 189 and 193 are mounted relative to the boost piston 26 and the inner wall of the bore of the master cylinder and can be made of any suitable sealing material, such as an elastomeric material, and can be formed into any suitable sealing structure, such as a lip seal or an O-ring. An intermediate chamber 36 is generally defined by the housing, the boost piston 26, the primary piston 28 and seals 29 and 31. The seal 29 is mounted relative to the primary piston 28 and the inner wall of the bore of the master cylinder. The seal 31 is mounted on the boost piston 26. The seals 29 and 31 (as well as other seals shown and described herein) can be made of any suitable sealing material, such as an elastomeric material, and can be formed into any suitable sealing structure, such as a lip seal or an O-ring. A primary chamber 38 is generally defined by the housing, the primary piston 28, and a seal 191. The seal 29 is mounted relative to the primary piston 28 and the inner wall of the bore of the master cylinder.

It should be understood that the mounting locations of the various seals, as shown in the drawings, are schematically illustrated and can be mounted at any suitable location, such as on the movable piston or component or stationary mounted on the wall of the corresponding bore.

A control conduit 40 is in fluid communication with the boost chamber 34 and selectively in fluid communication with a pair of wheel brakes 42 and 44, as will be explained in detail below. A primary conduit 46 is in fluid communication with the primary chamber 38 and selectively in fluid communication with a pair of wheel brakes 48 and 50, as will be explained in detail below.

The brake system 10 further includes a source of high pressure or fluid pressure generator circuit, indicated by a phantom schematic outline 60 in FIG. 1. The fluid pressure generator circuit 60 provides relatively high pressurized fluid to the boost valve 32 via a high pressure conduit 62 preferably through a regulator valve 86, as will be described below. The fluid pressure generator circuit 60 can also provide fluid pressure to the various wheel brakes, as described below in further detail, even if the driver does not actuate the brake pedal 14. The circuit 60 includes a pump 64 which is driven by a motor 66. The pump 64 has an inlet 68 in fluid communication with the reservoir 18 via a conduit 70, and an outlet 72 in fluid communication with the high pressure conduit 62. A filter 74 may be used in the conduit 70. A valve 76 may also be arranged in a parallel arrangement relative to the conduit 70 about the filter 74 to provide fluid flow from the reservoir 18 via the conduit 70 to the inlet 68 of the pump 64 in case of a fluid flow blockage through the filter 74.

The fluid pressure generator circuit 60 further includes an accumulator 80 which is in fluid communication with the high pressure conduit 62 to provide a storage of pressurized fluid for the conduit 62. The accumulator 80 can be any suitable high pressure accumulator structure. For example, the accumulator 80 can include a diaphragm or metal bellows which is biased by a gas, such as nitrogen, to pressurize the fluid stored in the accumulator 80. Alternatively, the accumulator 80 can include a piston which is biased by a spring to pressurize the fluid stored in the accumulator 80. The pump 64 and accumulator 80 operates to draw fluid from the reservoir 18 and supply fluid at an increased pressure to the high pressure conduit 62. The pump 64 is actuated when the pressure in the conduit 62 falls below a predetermined pressure.

A pressure relief valve 82 selectively permits fluid communication between the outlet 72 of the pump 64 and the reservoir 18 via a return conduit 84. The pressure relief valve 82 limits the output pressure of the pump 64 by opening at a predetermined pressure to create a return path between the pump outlet 72 and the pump inlet 68 via the reservoir 18. Preferably, the pressure relief valve 82 can be manually actuated to its open position for bleeding of the brake system 10 and/or for discharging the high pressure accumulator 80.

As best shown in FIG. 2, the brake system 10 preferably includes a pressure regulator valve, indicated generally at 86. The valve 86 can be any suitable valve structure which provides a limiting controlled pressure level in a pressure conduit 88 from the high pressure conduit 62. The conduit 88 provides fluid communication between the regulator valve 86 and a high pressure chamber 90 of the boost valve 32 generally defined by the housing of the master cylinder, the components of the boost valve 32, and the seals 31 and 193. The regulator valve 86 includes a plunger 92 slidably disposed in a bore 93 of a housing and sealingly engaged therewith by a seal 95. The plunger 92 defines chambers 94 and 96 within the bore. The plunger 92 is biased by a spring 98 to reduce the volume and increase the pressure of the fluid within the chamber 94. The chamber 94 is in fluid communication with the high pressure chamber 90 via the pressure conduit 88. The chamber 96 is in fluid communication with the boost chamber 34 via the control conduit 40. A pin 100 extends from the plunger 92 and through a valve seat 102 formed in the housing. A valve member, such as a ball 104, is positioned adjacent the valve seat 102 and is selectively disengaged with the valve seat 102 by the lifting of the ball 104 by the movement of the pin 100. The ball 104 is disposed in a chamber 106 which is in fluid communication with the high pressure conduit 62. The ball 104 is biased in a direction towards the valve seat 102 by a spring 108.

Generally, the pressure regulator valve 86 lowers the fluid pressure flowing from the high pressure conduit 62 from the fluid pressure generator circuit 60 into the boost chamber 90 of the boost valve 32 so that the boost valve 32 does not have to operate with a relatively high pressure input. One of the advantages of providing a reduced high pressure input is that the forces acting on various seals of the boost piston 26 are reduced, thereby improving reliability and pressure modulation of the boost valve 32 by reducing hysteresis. Preferably, the regulator valve 86 supplies fluid to the boost valve 32 via the conduit 88 at a slightly higher pressure value, such as between 2 to 20 Bar, above the requested boost pressure as requested by the driver input by depression of the brake pedal 14.

The brake system 10 further includes a control valve 120 which is fluid communication between the high pressure conduit 62 and a conduit 122. The control valve 120 is preferably a normally closed 2-position, 2-way solenoid operated valve having a first, normally closed position, and a second open position to permit fluid flow between the conduit 62 and the conduit 122. A control valve 124 is in fluid communication between the control conduit 40 and the conduit 122. The control valve 124 is preferably a normally open 2-position, 2-way solenoid operated valve having a first normally open position, and a second one-way position for restricting fluid flowing from the conduit 122 to the conduit 40 but permitting fluid to flow in the opposite direction at a relatively low predetermined pressure level.

An isolation valve 126 is in fluid communication between the primary conduit 46 and a conduit 128 which is in fluid communication with the wheel brake 48. An isolation valve 130 is in fluid communication between the primary conduit 46 and a conduit 132 which is in fluid communication with the wheel brake 50. The isolation valves 126 and 130 are preferably normally open 2-position, 2-way solenoid operated valves having first, normally open positions, and second, closed positions.

As shown in FIG. 1, the brake system 10 further includes apply valves 134 and 136 which are selectively in fluid communication with the conduit 122 and the conduits 128 and 132, respectively. An apply valve 138 is in fluid communication with the conduit 122 and a conduit 140 which is in fluid communication with the wheel brake 42. An apply valve 142 is in fluid communication with the conduit 122 and a conduit 144 which is in fluid communication with the wheel brake 44. The apply valves 134, 136, 138, and 142 are preferably normally open 2-position, 2-way solenoid operated valves having first, normally open positions, and second, one-way positions for restricting fluid from flowing from the conduit 122 to the wheel brakes 48, 50, 42, and 44, respectively, but permitting fluid to flow in the opposite direction at a relatively low predetermined pressure level.

The brake system 10 preferably further includes release valves 146, 148, 150, and 152 are in fluid communication between the conduits 128, 132, 140, and 144, respectively, and the return conduit 84. The release valves 146, 148, 150, and 152 are preferably normally closed 2-position, 2-way solenoid operated valves having first normally closed positions, and second open positions for permitting flow between the respective wheel brakes and the conduit 84 to the reservoir 18. Generally, the apply valves 134, 136, 138, and 142 and the release valves 146, 148, 150, and 152 are selectively pulsed between closed and opened positions to provide a decreased, increased, or maintained pressure at the wheel brakes 48, 50, 42, and 44, for anti-lock braking (ABS) operations, traction control (TC) operations, vehicle stability control (VSC) operations, and dynamic rear proportioning (DRP) operations, for example.

The brake system 10 further includes a pair of separator valves 154 and 156 which generally keep the fluid circuits associated with the wheel brakes 48 and 50 separated from the fluid circuits associated with the wheel brakes 42 and 44 via the conduit 122. The separator valves 154 and 156 are preferably normally closed 2-position, 2-way solenoid operated valves having first normally closed positions, and second open positions.

Although the wheel brakes 42, 44, 48 and 50 can be any suitable wheel brake of a vehicle, it is preferred that the wheel brakes 42 and 44 are associated with the rear wheel brakes of the vehicle, and the wheel brakes 48 and 50 are associated with the front brakes of the vehicle. The separator valves 154 and 156 are operable to closed positions to help isolate the two circuits for fail safe reasons in case one of the circuits has a leak or other failure associated with it. The separator valve 154 is in fluid communication between the apply valve 134 and the conduit 128. The separator valve 156 is in fluid communication between the apply valve 136 and the conduit 132.

The brake system 10 preferably further includes a travel rate piloted valve 160 located in the conduit 22. The piloted valve 160 regulates the flow of fluid between the intermediate chamber 36 and the reservoir 18. The piloted valve 160 is movable between a normally open position 160a and a closed position 160b. Preferably, the piloted valve 160 is a normally open, pilot operated 2-position, 2-way valve, but can be any suitable valve arrangement. The positioning of the valve 160 is regulated by the pressure differential between the return conduit 84 via a conduit 162 and the boost chamber 34 via a conduit 164. The brake system 10 may also include a check valve 166 located in a conduit 168 between the intermediate chamber 36 and the high pressure conduit 62.

As best shown in FIG. 2, the boost valve 32 is preferably incorporated into the boost piston 26 of the master cylinder 12. The boost valve 32 is similar in function and structure as boost valves disclosed in U.S. Pat. No. 6,183,050 which is incorporated by reference herein.

The brake system 10 preferably includes a pressure transducer or sensor 170 to monitor the pressure level within the high pressure conduit 62. The brake system 10 also preferably includes a pressure sensor 172 to monitor the pressure level within the boost chamber 34 and the control conduit 40.

The brake system 10 includes a microprocessor or an electronic control unit (ECU) (not shown) which controls the electrically operated components of the brake system 10. The ECU also receives signals from the various sensors of the brake system 10. Thus, the ECU controls the motor 66 of the pressure generator circuit 60 and valves 120, 124, 126, 130, 134, 136, 138, 142, 146, 148, 150, 152, 154, 156 during operation of the brake system 10. The ECU controls the brake system 10 using information from various sensors (not all shown), such as the switches 16 and 24 and the pressure sensors 170 and 172. The sensors 170 and 172 are preferably redundant output sensors in that two generally independent simultaneous output readings are emitted and cross checked with each other by the ECU for fail safe reasons. Examples of other sensors which may be connected to the ECU include wheel speed sensors, yaw sensors, acceleration sensors, and steering angle sensors.

As best shown in FIG. 2, the master cylinder 12 includes an input mechanism, indicated generally at 13, for transferring the input force as applied by the driver's foot acting on the brake pedal 14 to the boost valve 32. The input mechanism 13 transmits the input force from the brake pedal to the boost valve 32 so that the boost valve 32 can supply fluid pressure in the boost chamber 34 at a pressure level corresponding to the input force. The pressure within the boost chamber 34 assists in driving the boost piston 26 leftward, as viewing FIGS. 1 and 2, due to the stepped configuration of the boost piston 26.

Preferably, the input mechanism 13 is housed within the boost piston 26. The input mechanism 13 includes an input piston 299 operatively connected to the brake pedal 14. The input piston 299 acts against a piston 204. The piston 204 includes an extension portion 210, on the left-hand side thereof as viewing FIG. 2. The end of the extension portion 210 acts on a valve member 213 of the boost valve 32. The end of the extension portion 210 is also acted on by the pressure of the boost chamber 34 which is in fluid communication with an interior chamber 211 of the boost valve 32. The extension portion 210 is slidably disposed in a through bore of a sleeve 202. The sleeve 202 is slidably disposed in a bore of the boost piston 26. A spring 203 biases the right-hand end of the sleeve 202 in a leftward direction against a seal 222 mounted about the extension portion 210. The seal 222 is formed so that pressure within the interior chamber 211 pushes on the seal 222 to impart a force against thereon and provides a sealing engagement with the wall of the bore of the boost piston 26 and the outer surface of the extension portion 210. The fluid acting against the left-hand end of the seal 222 is in fluid communication with the interior chamber 211. The piston 204 includes a passageway 214 formed therein which is in fluid communication with the return conduit 22 of the reservoir 18 and the interior chamber 211 when the valve member 213 of the boost valve 32 is open. The operation of the input mechanism will be discussed below.

The master cylinder 12 also preferably includes a compensation assembly, indicated generally at 250. The compensation assembly 250 provides fluid communication between the primary chamber 38 and the reservoir 18 via the conduit 20 when the primary piston 28 is fully retracted in the rightward direction, as viewing FIG. 2, when the driver is not imparting a force on the brake pedal 14. This assures that a pressure build up does not exist in the primary chamber 38, and therefore the wheel brakes 48 and 50, when the driver is not depressing the brake pedal 14. The compensation assembly 250 includes a pin 252 having ends mounted in the housing of the master cylinder 12. Thus, the pin 252 is fixed relative to the housing of the master cylinder 12. The primary piston 28 includes a slot 254 through which the pin 252 extends. The left-hand end of the slot 254 defines a wall 256. The primary piston 28 includes a stepped through bore 258 formed therein providing selective communication between the primary chamber 28 and the conduit 20 via the slot 254. A valve member 260 is disposed in the bore 258 and is biased by a spring 261 against a valve seat 262. The valve member 260 has an extension portion 264 which extends through the bore 258. The extension portion 264 is sized so that an end thereof may extend past the wall 256 when not contacting the pin 252.

When the primary piston 28 is in its fully retracted position, by the assistance of a return spring 266 and generally no force exerted by the driver via the pedal 14, the end of the extension portion 264 contacts the pin 252 thereby moving the valve member 260 away from the valve seat 262, thereby permitting flow between the primary chamber 38 and the reservoir 18. Upon movement of the primary piston 28, such as during normal boosted braking or manual push through, as described below, the extension portion 264 is permitted to pass beyond the wall 256 and close the valve member 260 against the valve seat 262, thereby permitting an increase in pressure within the primary chamber 38. It is noted that the placement and dimensions of the pin and other components can be configured in any suitable manner such that the compensation assembly 250 provides fluid communication between the primary chamber 38 and the reservoir 18 via the conduit 20 when the primary piston 28 is fully retracted in the rightward direction. For example, the extension portion 264 portion 264 may extend past the wall 256 even when the valve member 260 is past the valve seat 262.

The operation of the brake system 10 shall now be described. During normal boosted braking operation, the driver of the vehicle in which the brake system 10 is installed, will depress the brake pedal 14 to actuate the wheel brake 42, 44, 48, and 50. The term "normal boosted braking" refers to the operation of the brake system 10, wherein the ignition system of the vehicle is on and the brake system 10 has not entered into an ABS, TC, or VSC operation. During operation of the vehicle and based on information from the pressure sensor 170, the motor 66 of the pump 68 is actuated to supply relatively high fluid pressure to the accumulator 80 and the high pressure conduit 62 within a selected pressure range. Generally, the fluid pressure within the high pressure conduit 62 will be greater than the fluid pressure within the conduits 40 and 46 although high demand by the driver depressing the brake pedal may cause the pressure generated in the master cylinder 12 to be higher than the pressure obtainable by the pressure generator circuit 60.

Movement of the brake pedal 14 generally causes the input mechanism 13 to operatively actuate the boost valve 32. Preferably, the input mechanism 13 of the brake system 10 provides a "jump-in" feature in which there is a greater boost gain in the beginning of the braking operation at lower pedal force input. This jump-in feature will be described in greater detail below. Movement of the input mechanism 13 via the input piston 299 causes the boost piston 26 to travel in the leftward direction, as viewing FIGS. 1 and 2. This movement also actuates the boost valve 32 to supply pressurized fluid to the boost chamber 34.

The boost valve 32 can be any suitable valve mechanism, such as a poppet valve or spool valve, that supplies pressurized fluid to the boost chamber 34 at a pressure level corresponding to the input force acting on the brake pedal 14 by exertion of the driver's foot. The corresponding pressure of the boost chamber relative to the input force can be linear or non-linear. The boost valve 32 utilizes the fluid pressure from the source of high pressure 60 (accumulator 80) to provide a controlled boost pressure in the boost chamber 34.

As the pressure within the boost chamber 34 in increased due to driver demand via the pedal 14, the piloted valve 160 is moved to its closed position 160b due to the pressure differential between the boost chamber 34 via the conduit 164 and the reservoir 18 via the conduit 162. During normal boosted braking, the pressure in the boost chamber 34 and the conduit 164 will be generally higher than in the reservoir 18 and the conduit 162. The piloted valve 160 prevents the fluid within the intermediate chamber 36 from escaping and essentially traps the volume of the fluid within the intermediate chamber 36. Note that the check valve 166 will usually only open at levels higher than the pressure level within the high pressure conduit 62.

Preferably, the boost piston 26 moves leftward after the piloted valve 160 is shuttled to its closed position to provide relatively little boost piston 26 movement (lost travel) prior to pressure build up. Leftward movement of the boost piston 26, as viewing FIGS. 1 and 2, causes the primary piston 28 to also move in the leftward direction. Due to the trapped fluid within the intermediate chamber 36 and the difference in effective hydraulic areas or diameters of the pistons 26 and 28, the primary piston 28 will separate from boost piston 26 and will move at a greater rate relative to the boost piston 26 during a normal boosted braking operation. Thus, the pistons 26 and 28 have different travel rates during normal boosted braking. As shown in FIG. 2, the effective hydraulic area for the boost piston 26 is generally the area defined by the bore 30 of the housing about the seal 31 (the right-hand side of the chamber 36). The effective hydraulic area for the primary piston 28 is generally the area defined by the bore 30 of the housing about the seal 29 (the left-hand side of the chamber 36). As shown in FIG. 2, the effective hydraulic area of the boost piston 26 is larger than the effective hydraulic area of the primary piston 28.

Preferably, a seal 189 should have an equal or smaller effective hydraulic area than a seal 29 so that different travel rates for the pistons 26 and 28 will normally not occur once the pistons 26 and 28 are in contact with each other during the travel rate feature, as discussed below. The check valve 166 provides a flow path from the intermediate chamber 36 through the regulator valve 86 and into the boost chamber 34 if the pressure within the intermediate chamber is greater than the pressure within the boost chamber, for example during a failed boost condition. This has the effect of essentially removing seals 193 and 31 of the boost piston.

Movement of the primary piston 28 in the leftward direction, as shown in FIGS. 1 and 2, causes a pressure increase in the primary chamber 38. Fluid will flow out of the primary chamber 38, through the conduit 46, the isolation valves 126 and 130, and the conduits 128 and 132, thereby actuating the wheel brakes 48 and 50.

The brake system 10 preferably includes a switchable travel rate feature. During normal boosted braking, the primary piston 28 will separate from boost piston 26 and will move at a greater rate relative to the boost piston 26, as described above. If the boost valve 32 or pressure generator circuit 60 fails such that the master cylinder 12 does not receive boosted pressure (or a lesser amount than during a normally working operation), the master cylinder 12 provides for a manual push-through operation in which the pistons 26 and 28 can be manually pushed by the brake pedal 14 by mechanical connection between the input piston 299, the boost piston 26, and the primary piston 28. During this manual push-through operation, the pistons 26 and 28 will travel together at the same travel rate since the flow of the fluid can exit through the pilot valve 160 biased to its open position 160a or exit through check valve 166. Movement of the primary piston 28 pressurizes the fluid within the primary chamber 38 and supplies pressurized fluid for the conduit 46 and to the wheel brakes 48 and 50. Preferably, the wheel brakes 48 and 50 are associated with the front wheels of the vehicle. The advantage of changing the travel rates is that during manual push through the smaller effective hydraulic area of the primary piston 28 about the seal 191 permits the driver to more easily deliver higher pressure to the wheel brakes 48 and 50. Although more travel is required, a lower input force is required compared to the input force required during normal boost braking. Thus, more travel of the brake pedal 14 and input piston 299 is required to achieve the same pressure in the primary chamber 38 compared to normal boosted braking. The pressurized fluid from the boost chamber 34 flows into the control conduit 40, through the control valve 124, the apply valves 138 and 142, the conduits 140 and 144, thereby actuating the wheel brakes 42 and 44.

During an ABS event, the ECU controls the various valves to regulate the pressure to the respective wheel brakes 48, 50, 42, and 44. The valves may be controlled by energizing them in a pulsed manner between their two positions. For example, if the ECU detects that the wheel corresponding to the wheel brake 48 begins to slip appreciably during braking, an ABS dump mode may be entered into. The pressure at the wheel brake 48 is reduced to allow the wheel to spin back up to vehicle speed. To reduce the pressure at the wheel brake 48, the isolation valve 126, the apply valve 134, and the separator valve 154 are energized. The term "energized" as discussed herein generally refers to the valve changing to its other than normal position, as shown in FIG. 1. The release valve 146 can then be pulsed to its open position to allow fluid to flow to the reservoir via the return conduit 84 in a controlled manner. The brake system 10 may enter into an ABS hold mode to give the wheel time to spin back up to speed. During the ABS mode, the pressure at the wheel brake 48 is generally held constant by controlling the isolation valve 126, the release valve 146, and preferably opening the separator valve 154 and closing the apply valve 134. When the ECU detects that the wheel associated with the wheel brake 48 spins back up to near vehicle speed, an ABS apply mode may be entered into in which pressure is increased at the wheel brake 48. The apply valve 134 can be deenergized or pulsed off to permit fluid from the conduit 122 to flow to the wheel brake 48. Preferably, at the end of the ABS event, the valves 134 and 154 are deenergized and the valve 126 is pulsed to equalize the pressure between the master cylinder and the wheel brake 48 in case the boost valve 32 is under a run-out condition in which the boost valve 32 is at maximum pressure capacity. Control of the wheel brake 50 in an ABS event operates in a similar manner as the control of the wheel brake 48, as described above.

If the ECU detects that the wheel corresponding to the wheel brake 42 begins to slip appreciably during braking, an ABS dump mode may be entered into in which the pressure at the wheel brake 42 is reduced to allow the wheel to spin back up to vehicle speed. The apply valve 138 is energized to its one-way or closed position and the release valve 150 can be pulsed to permit the flow of fluid from the wheel brake 42 to flow into the return conduit 84. The apply valve 138 can be pulsed to its open position to increase pressure during an ABS apply mode. Control of the wheel brake 44 in an ABS event operates in a similar manner as the control of the wheel brake 42, as described above.

When a driven wheel begins to slip during acceleration, the brake system may enter into a traction control (TC) mode. The slipping wheel is braked to slow the wheel and regain traction for maximum vehicle acceleration. During a TC mode, the ECU may actuate the fluid pressure generator circuit 60 if required to provide pressurized fluid to the high pressure conduit 62 above a predetermined pressure. If for example, the wheel brakes 48 and 50 are associated with the driven wheels, the valves 120 and 124 are energized to provide pressurized fluid to the conduit 122. The valves 138 and 142 are energized to their closed positions. The valves 126 and 130 are energized to their closed positions. The valves 134 and 136 are modulated or pulsed to supply pressurized fluid from the conduit 122 to the wheel brakes 48 and 50 in a controlled manner. The valves 154 and 156 are energized to their open positions during the TC event. The valves 146 and 148 can be pulsed to release pressure from the wheel brakes 48 and 50. The apply valves 138 and 142 may be energized to their generally closed positions to prevent an increase in pressure in the wheel brakes 42 and 44.

During a VSC event, braking may be required on one or more wheels to improve cornering stability of the vehicle. The driver may or may not be braking at that time, and the braking pressures required may exceed the pressure generated by the master cylinder 12 and boost valve 32. The brake system 10 is actuated and controls the operation of the valves 120 and 124 in a similar manner as during a TC event, as described above. The brake system may also release pressure into the conduit 122 during a release mode by controlling the separator valves 154 and 156. The apply and release valves corresponding to the wheel brakes which are to be actuated control the wheel brake pressure to achieve the desired braking effect. In the embodiment of the brake system 10 as described above, each wheel brake 42, 44, 48, and 50 can be independently modulated from the others.

The control valves 120 and 124 may also be selectively pulsed between closed and opened positions to provide a decreased, increased, or maintained pressure at the wheel brakes 42, 44, 48, 50 for a VSC braking operation, for example. This may be desirable to help maintain a simultaneous constant pressure at the selected wheel brakes. For example, the use of the separate apply valves 134, 136, 138, and 142 and the release valves 146, 148, 150, and 152 may not control the simultaneous pressure due to the manufacturing differences and the PV (pressure volume) characteristics of the brakes.

The brake system 10 may also be used to provide Dynamic Rear Proportioning (DRP). When the brake system 10 enters into a DRP mode, the braking pressures on the front and rear brakes are separately controlled to achieve greater braking performance at the front and rear axles. For example, the brake system 10 can be configured such that the wheel brakes 48 and 50 are associated with the front wheels, and the wheel brakes 42 and 44 are associated with the rear wheels. The respective apply valves are regulated to increase the braking pressure at the brakes of the rear wheels at a different pressure from the front brakes, as required to achieve maximum braking effort with minimum wheel slippage.

Preferably, the apply valves 134, 136, 138, and 142 include check valves or lip seals in their one-way positions to prevent the flow of fluid from the conduit 122 to the wheel brakes but permit the flow of fluid from the wheel brakes to the conduit 122 in case during an ABS event the driver lets up on the brake pedal 14, this permits the pressure to drop from the wheels brakes. This is advantageous because the ECU may not have sensor information regarding the pressure levels at the wheel brakes to correctly actuate various valves to permit fluid flow.

Figure 3:
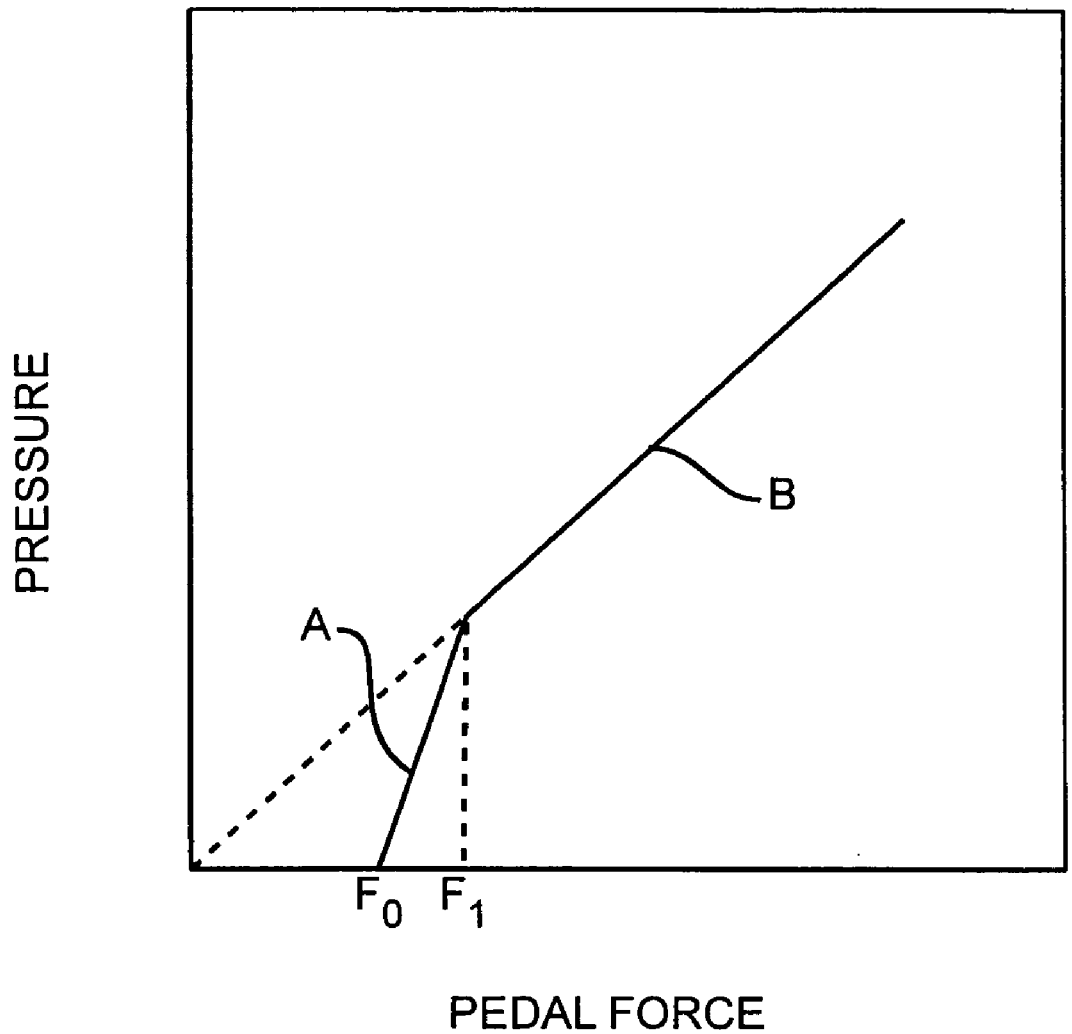
FIG. 3 is a graphical representation of output pressure versus pedal force input illustrating a jump-in feature of the present invention.

As stated above, the brake system 10 preferably includes a "jump-in" feature in which there is a greater boost gain in the beginning of the braking operation at lower pedal force input. This can be accomplished by the input mechanism 13. There is shown in FIG. 3 a graphical representation of the boost pressure output of the conduit 40 versus the force exerted by the driver on the brake pedal 14. As shown in FIG. 3, the gain of the pressure increase is at a higher slope, as represented by the region "A", than in a region "B" corresponding to the remainder of the boosted braking operation. Thus, in the region A, less pedal force is required to obtain a desired pressure compared to the region B. This jump-in feature is similar in function to the operation of a conventional vacuum booster using an elastomeric reaction disk expanding into a void. Note that a force $F_o$ is required to overcome the spring forces, such as for example, the spring 203 and seals of the input mechanism before any pressure output is obtained.

Movement of the brake pedal 14 generally causes input piston 299 to act against the piston 204. The extension portion 210 of the piston 204 advances slightly within the interior chamber 211 of the boost valve 32. Note that during initial movement of the piston 204, the spring force of the spring 203 biases the sleeve 202 leftward, as viewing FIG. 2, against a shoulder formed in the bore of the boost piston 26. Thus, during initial brake apply at relatively low input force, the sleeve 202 does not move relative to the boost piston 26. Initial movement of the piston 204 relative to the boost piston 26 corresponds to the slope A of FIG. 3. Thus, during the force input in the region A, the driver input to the boost valve 32 corresponds to the effective hydraulic area of the extension portion, i.e., the effective hydraulic area of the inner diameter of the seal 222. This relatively small area enables a relatively large gain in pressure, as shown by the slope A. After a sufficient pressure increase within the interior chamber 211 (and boost chamber 34) of the boost valve 32 caused by further input force, the spring 203 compresses further caused by rightward movement of the seal 222 and the sleeve 202 due to the pressure within the interior chamber 211 which corresponds to the point $F_1$ of FIG. 3. Once the pressure of the interior chamber 211 and the boost chamber 34 reaches a level corresponding to input force $F_1$, the driver input to the boost valve 32 corresponds to the effective hydraulic area of the outer diameter of the sleeve 202, i.e., the effective hydraulic area of the outer diameter of the seal 222 having the effect that the force of the spring 203 is no longer "felt" by the driver input. This relatively large area reduces the gain in pressure, as shown by the slope B. Concurrent movement of the piston 204 along with the sleeve 202 relative to the boost piston 26 corresponds to the slope of FIG. 3. Thus, the jump-in feature provides a greater boost gain in the beginning of the braking operation at lower pedal force input.

The input mechanism 13 which provides the jump-in feature is physically positioned between the input piston 299 and the boost valve. In conventional vacuum boosters having an elastomeric reaction disk for providing a jump-in feature, the reaction disk is physically positioned downstream of the boost valve, and not between the input piston and the boost valve.

Note that as the piston 204 and/or sleeve 202 are advanced forward by an increased input force, the boost valve 32 will increase the pressure in the boost chamber 34 which assists in hydraulically advancing the boost piston 26 because of its stepped cross-sectional profile, until the boost piston 26 is balanced.

If desired, the input mechanism could be configured to include a compressible material, such as an elastomeric material, adjacent the right-hand end of the sleeve 202 and the spring 203 to cushion the impact of the sleeve 202 hitting the shoulder on piston 204 which corresponds to the location $F_1$ if a relatively strong rapid input force was exerted.

Figure 4:
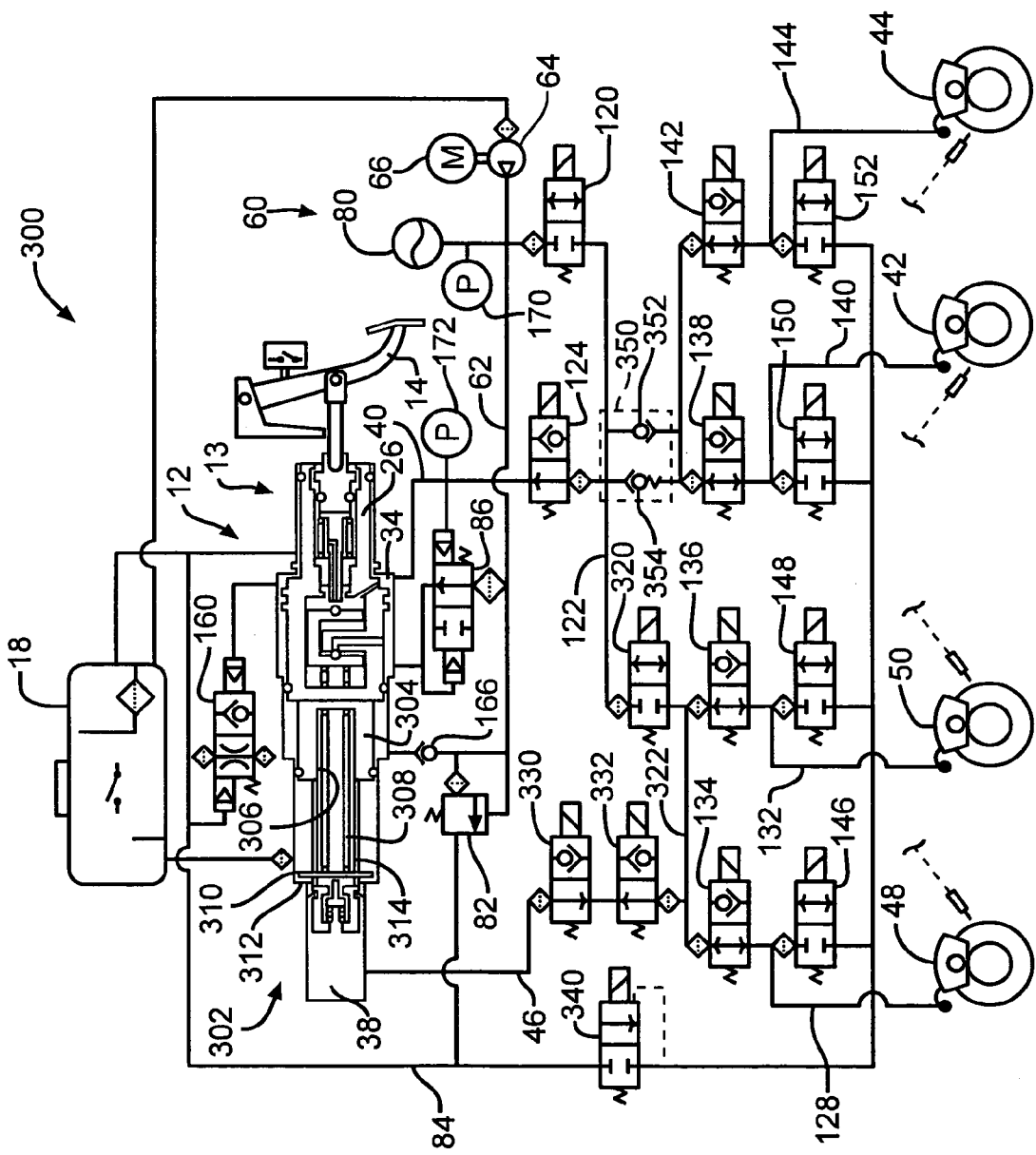
FIG. 4 is a hydraulic schematic view of a second embodiment of a brake system in accordance with the present invention.

There is illustrated in FIG. 4, a second embodiment of a brake system, indicated generally at 299. The brake system 300 is similar to the brake system 10 illustrated in FIGS. 1 and 2, and therefore, similar features, components, and operation thereof will generally not be discussed in duplicate. Similar components will include like names and reference numbers.

One of the differences between the brake system 10 and the brake system 300 is the master cylinder compensation assembly. The brake system 300 includes a different compensation assembly 302 and a differently constructed primary piston 304. The primary piston 304 includes a bore 306 formed therein which houses a return spring 308. The compensation assembly 302 has a pin 310 which is not fixed to the master cylinder housing, as in the pin 252 of the brake system 10. Instead, the pin 304 is biased leftward, as viewing FIG. 4, by the return spring 308 against a shoulder 312 formed in bore of the housing of the master cylinder 12. The spring 308 provides one of the same functions as the return spring 266 of the brake system 10 by returning the boost piston 26 and primary piston 304 to their initial retracted position after absence of an input force. During movement of the primary piston 304, the pin 310 is pushed against the shoulder 312 and travels within a longitudinal slot 314 formed in the primary piston 304. Thus, the pin 310 generally remains fixed relative to the master cylinder housing during brake operation via an input force as the primary piston 304 is advanced. When the primary piston 304 is returned to its fully retracted position, the return spring 308 applies force to the valve member of the compensation assembly via the pin 310 to open the valve member relative to the valve seat. An advantage of the compensation assembly 302 compared to the compensation assembly 250 is that pin 310 is more easily accurately positioned and fixed in the master cylinder housing.

The brake system 300 includes release valves 146, 148, 150, and 152 and control valves 120 and 124 which are oriented and operate in a similar manner as the corresponding valves in the brake system 10. The brake system 300 also includes apply valves 138 and 142 associated with the wheel brakes 42 and 44 which are oriented in the brake circuit and operate in a similar manner as the corresponding valves in the brake system 10.

The brake system 300 also includes apply valves 134 and 136 which function and operate in a similar manner as the corresponding valves in the brake system 10, but are oriented in brake circuit in a slightly different position. The apply valves 134 and 136 are in direct fluid communication with the conduits 128 and 132. Contrary, the brake system 10 positions separator valves 154 and 156 between the conduits 128 and 132, respectively, and the apply valves 134 and 136, respectively.

The brake system 300 includes a single separator valve 320 disposed between the conduit 122 and a conduit 322 which is in fluid communication with the apply valves 134 and 136. The separator valve 320 generally keeps the fluid circuits associated with the wheel brakes 48 and 50 separated from the fluid circuits associated with the wheel brakes 42 and 44. Note that the separator valve 320 has an opposite porting in its open position, indicated by the direction arrow, compared to the separator valves 154 and 156 of the brake system 10. This porting of the separator valve 320 reduces the armature spring requirements within the valve structure since the maximum manual pressure from the primary chamber 38 is usually less than the maximum pressure from the source of high pressure 60, thereby making it possible to increase the flow of fluid through the single separator valve 320 without increasing the solenoid force required to operate the separator valve 320.

The brake system 300 further includes a pair of isolation valves 330 and 332 hydraulically connected in series between the conduit 46 from the primary chamber and the conduit 322. The isolation valve 330 is preferably a normally open 2-position, 2-way solenoid operated valve having a first, normally open position, and second, one-way check valve position which restricts the flow of fluid from the conduit 46 to the isolation valve 332, but permits the flow of fluid above a predetermined pressure level in the opposite direction. The isolation valve 332 is preferably a normally open 2-position, 2-way solenoid operated valve having a first, normally open position, and second, one-way check valve position which restricts the flow of fluid from the conduit 322 to the isolation valve 330, but permits the flow of fluid above a predetermined pressure level in the opposite direction. The one way check valve feature of the isolation valves 330 and 332 can be accomplished by lip seals which deflect to permit the flow of fluid within the valve structure. An advantage of having the isolation valves 330 and 332 connected in series is that the flow of fluid between the conduits 46 and 322 can be controlled in all directions. If desired, a single 3-position valve could be substituted for the pair of isolation valves 330 and 332.

The brake system 300 preferably further includes a single dump valve 340 located within the return conduit 84. The dump valve 340 is preferably a normally closed 2-position, 2-way solenoid operated valve having a first normally closed position, and second open position for permitting flow between wheel brakes 42, 44, 48, and 50 and the reservoir 18 via the conduit 84. When the dump valve 340 is in its closed position, the dump valve 340 permits pressure to be maintained on all four wheel brakes in the event that one or more of the release valves 146, 148, 150, and 152 does not properly seal in its closed position.

The dump valve 340 also preferably functions as a relief valve, as indicated schematically on FIG. 4, such that if the pressure in the conduit 84 on the wheel brake side is sufficient enough, the valve is piloted to its open position to permit the flow of fluid to the reservoir 18. For example, if one of the release valves 146 and 148 improperly leaked, fluid could flow through the piloted dump valve 340 which transfers fluid from the system to the reservoir 18, and the driver would feel the pedal drop due to the pistons 26 and 28 advancing due to the exiting of fluid in the brake circuit. This pedal drop could alert the driver that something is malfunctioning, such as a leaky release valve. However, it is preferred that the pressure with which the dump valve 340 opens is sufficiently high enough to still permit adequate braking force of the wheel brakes. Leaking of a release valve 150 or 152 can be detected since leakage therethrough will cause the boost valve to compensate for the fluid loss which can be detected by the ECU.

The brake system 300 preferably further includes a pressure hold off valve 350, schematically indicated in FIG. 4. Although the hold off valve 350 could be included in the brake circuit 10, the brake circuit 10 has a direct flow path between the conduit 122 and the apply valves 138 and 142. The hold off valve 350 generally includes a check valve feature 352 which permits the flow of fluid from the apply valves 138 and 142 to the conduit 122. The hold off valve also includes a spring biased valve 354.

The separator valve 320 essentially separates the fluid pressure from the brake circuit associated with the wheel brakes 48 and 50 from the brake circuit associated with the wheel brakes 42 and 44. This can allow a pressure differential across the separator valve 320, between the conduits 122 and 322. On brake apply when the driver depresses the pedal 14, the boost pressure in the boost chamber 34 may be higher than the pressure in the primary chamber 38 due to the pedal input force needed to overcome the spring 308, the seal 29, the seal 191, and the seals associated with the boost piston. Therefore, the pressure in the boost chamber 34 would generally be higher that the pressure in the primary chamber 38, and the fluid pressure delivered to the wheel brakes 42 and 44 would generally be higher than the pressure delivered to the wheel brakes 48 and 50. The higher pressure delivered to the wheel brakes 42 and 44 is generally not desirable. To compensate for the pressure differential, the spring force and the sealing area of the spring biased valve 354 are preferably sized to compensate for this pressure differential to "hold off" or decrease the pressure directed to the wheel brakes 42 and 44. Thus, the pressure differential required to overcome the spring biased valve 354 is preferably equal to the pressure differential across the separator valve 320. The hold off valve 350 could alternatively be positioned in the conduit 40 downstream of the boost chamber 34 to hold off pressure in the brake circuit associated with the wheel brakes 42 and 44.

The brake system 10 preferably includes means for alerting the driver if the separator valve 320 is defective, i.e., leaks fluid therethrough when in its closed position. If the separator valve 320 does not properly seal in its normally closed position, such as in normal boosted braking, fluid will leak from the conduit 122 into the conduit 322 because of the pressure differential across the separator valve 320. Because of the fluid leaking from the conduit 122 to the conduit 322, the piston 26 and 28 in the master cylinder may not travel or have less travel than normal. This shorter than normal pedal travel thereby provides a means for alerting the driver of a failure in the brake system 300 (an improperly sealing separator valve 320).

During operation of the brake system 300 in the normal boosted braking operation, the master cylinder 12, input mechanism 13 with the jump in feature, and the piloted valve 160 with the travel rate feature will generally operate in a similar manner as the brake system 10 described above. Fluid will flow out of the primary chamber 38, through the conduit 46, the isolation valves 330 and 332, the apply valves 134 and 136, and the conduits 128 and 132, thereby actuating the wheel brakes 48 and 50. The pressurized fluid from the boost chamber 34 flows into the control conduit 40, through the control valve 124 and the hold off valve 350, through the apply valves 138 and 142, the conduits 140 and 144, thereby actuating the wheel brakes 42 and 44.

During an ABS event of the brake circuit 300, the ECU controls the various valves to regulate the pressure to the respective wheel brakes 48, 50, 42, and 44. The valves may be controlled by energizing them in a pulsed manner between their two positions. For example, if the ECU detects that the wheel corresponding to the wheel brake 48 begins to slip appreciably during braking, an ABS dump mode may be entered into. The pressure at the wheel brake 48 is reduced to allow the wheel to spin back up to vehicle speed. To reduce the pressure at the wheel brake 48, the ECU will energize or actuate the dump valve 340 to its open position, the isolation valve 330 to its one-way position, and the separator valve 320 to its open position. The release valve 146 can then be pulsed to its open position to allow fluid to flow to the reservoir via the return conduit 84 in a controlled manner. The brake system 10 may enter into an ABS hold mode to give the wheel time to spin back up to speed. During the ABS mode, the pressure at the wheel brake 48 is generally held constant by controlling the apply valve 134 and the release valve 146. When the ECU detects that the wheel associated with the wheel brake 48 spins back up to near vehicle speed, an ABS apply mode may be entered into in which pressure is increased at the wheel brake 48. The apply valve 134 can be deenergized or pulsed off to permit fluid from the conduit 322 to flow to the wheel brake 48. Control of the wheel brake 50 in an ABS event operates in a similar manner as the control of the wheel brake 48, as described above.

The one way check valve feature of the isolation valve 330 permits an improved brake pedal 14 return over the brake system 10, since the one way check valve of the isolation valve 330 may provide a return flow path of pressurized boost fluid from the conduit 122 into the primary chamber 38 of the master cylinder 12. By providing this check valve feature, the isolation valve 330 may not need to be pulsed to prevent pedal drop caused by movement of the piston 26 and 28. Preferably, the isolation valve 330 and the separator valve 320 will be held energized while the apply valves 134 and 136 and release valves 146 and 148 are pulsed during various ABS modes. The separator valve 320 can optionally be de-energized to its closed position between ABS apply modes. Alternatively, a check valve function may by optionally inserted in the circuit in series with the separator valve 320 that only permits flow in a direction to the wheel brakes 48 and 50.

If the ECU detects that the wheel corresponding to the wheel brake 42 begins to slip appreciably during braking, an ABS dump mode may be entered into in which the pressure at the wheel brake 42 is reduced to allow the wheel to spin back up to vehicle speed. The dump valve 340 is energized to its open position. The apply valve 138 is energized to its one-way or closed position and the release valve 150 can be pulsed to permit the flow of fluid from the wheel brake 42 to flow into the return conduit 84. The apply valve 138 can be pulsed to its open position to increase pressure during an ABS apply mode. Control of the wheel brake 44 in an ABS event operates in a similar manner as the control of the wheel brake 42, as described above.

When a driven wheel begins to slip during acceleration, the brake system 300 may enter into a traction control (TC) mode. The slipping wheel is braked to slow the wheel and regain traction for maximum vehicle acceleration. During a TC mode, the ECU may actuate the fluid pressure generator circuit 60 if required to provide pressurized fluid to the high pressure conduit 62 above a predetermined pressure. The brake system 300 can be used in a vehicle having two or four wheel drive. There are a variety of ways in which the various valves of the brake system 300 can be operated to perform a TC operation. For a four wheel drive vehicle, the control valve 120 is preferably energized to introduce high pressure fluid into the conduit 122. The control valve 124 is preferably energized to restrict the flow of fluid from the conduit 122 into the boost chamber 34. The dump valve 340 is energized to permit the flow of fluid into the reservoir 18. The separator valve 320 is preferably energized to permit the high pressure fluid from the conduit 122 to enter the conduit 322. It is generally only necessary to energize the isolation valve 332 to prevent the high pressure fluid from the conduit 322 from entering the primary chamber 38. The applicable apply valves 134, 136, 138, and 142 and release valves 146, 148, 150, and 152 are modulated or pulsed to supply pressurized fluid from the conduit 122 to the wheel brakes or vent the wheel brakes in a controlled manner.

During a VSC event, braking may be required on one or more wheels to improve cornering stability of the vehicle. The driver may or may not be braking at that time, and the braking pressures required may exceed the pressure generated by the master cylinder 12 and boost valve 32. The brake system 300 is actuated and controls the operation of the valves 120 and 124 in a similar manner as during a TC event, as described above. The apply and release valves corresponding to the wheel brakes which are to be actuated control the wheel brake pressure to achieve the desired braking effect. In the embodiment of the brake system 300 as described above, each wheel brake 42, 44, 48, and 50 can be independently modulated from the others. In instances in which the pressure from the primary chamber 38 is higher than the boost pressure, the isolation valve 330 may b e energized to prevent a pedal drop by advanced travel of the pistons 26 and 28.

Figure 5:
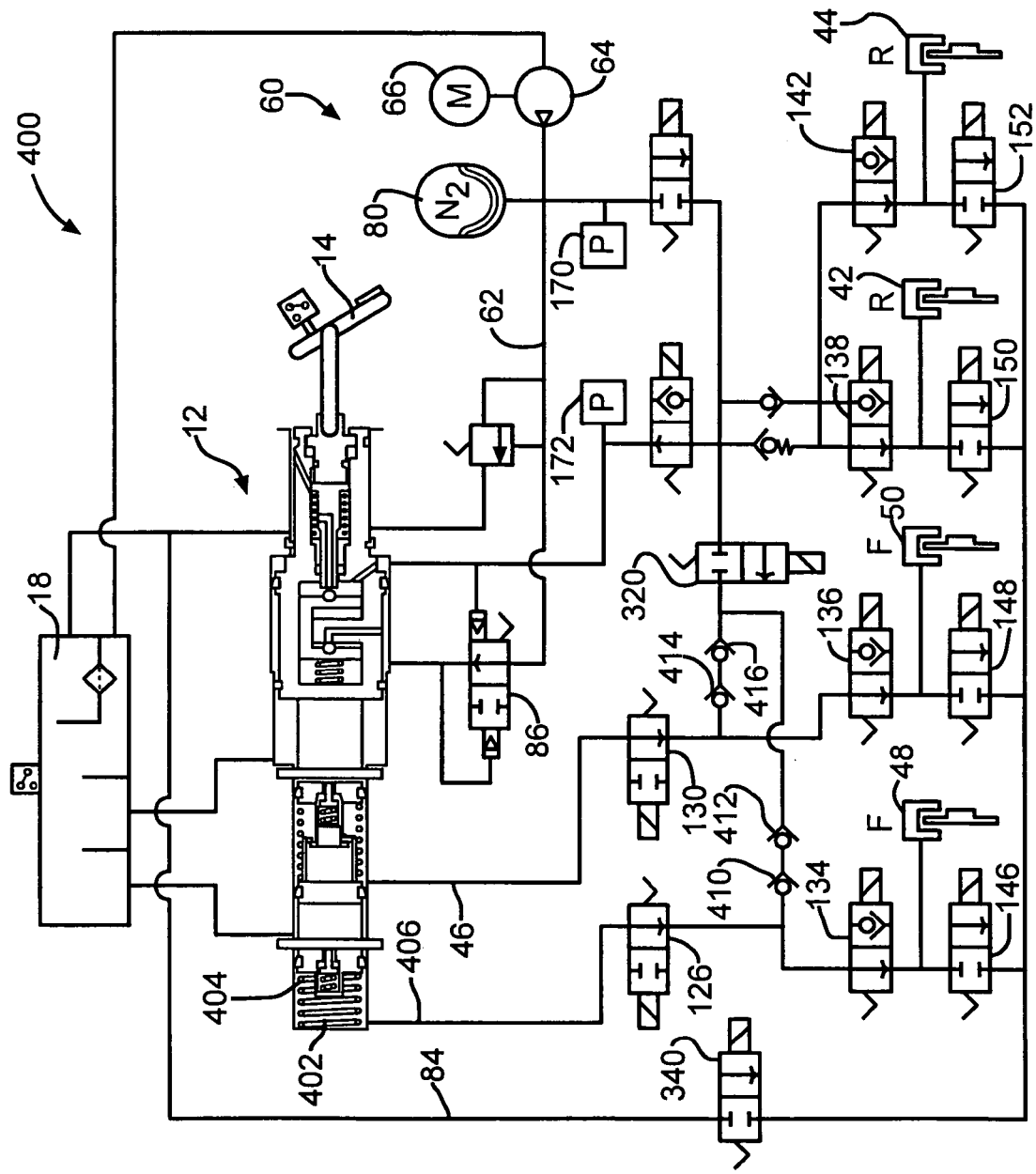
FIG. 5 is a hydraulic schematic view of a third embodiment of a brake system in accordance with the present invention.

The brake systems 10 and 300 are preferably used in a vertically split system in which the wheel brakes 48 and 50 are front brakes supplied by the primary chamber 38, and the wheel brakes 42 and 44 are rear brakes supplied by the boost chamber 34. In a failed condition, the systems 10 and 300 provide for manual push through to the front brakes, as described above. The systems 10 and 300 are ideally suited for vehicles, such as passenger trucks, which are typically heavier or able to carry relatively heavy cargo compared to lighter vehicles, such as passenger automobiles. There is illustrated in FIG. 5, a brake system, indicated generally at 400, which is more suited to these lighter weight passenger vehicle. The brake system 400 is similar to the brake system 300 illustrated in FIG. 4 and the brake system 10 in FIG. 1, and therefore, similar features, components, and operation thereof will generally not be discussed in duplicate. Similar components will include like names and reference numbers.

One of the differences between the brakes systems 10 and 300, and the brake system 400, is that the master cylinder 12 of the brake system 400 includes an additional secondary chamber 402. The master cylinder includes a secondary piston 404 which functions similarly to the primary pistons 28 and 304 of the brake system 10 and 300, respectively. This configuration is similar to a tandem master cylinder arrangement, in which fluid pressure is generated in the primary chamber 38 and the second chamber 402 at generally equal pressure levels. The primary chamber 38 is in selective fluid communication with wheel brake 50 via the conduit 46. The secondary chamber 402 is in selective fluid communication with the wheel brake 48 via a conduit 406. Thus, the wheel brakes 48 and 50 are generally isolated from one another. Preferably, the wheel brakes 48 and 50 are associated with the front wheel brakes of the vehicle. The wheel brakes 42 and 44 are preferably associated with the rear brakes of the vehicle, and the hydraulic circuit, valves, and operation thereof is similar to the brake system 300, as described above.

The brake system 400 may eliminate a travel rate piloted valve 160 and check valve 166 since the brake system 400 can be used in relatively light vehicle, and therefore, the vehicle may be able to stop within a relatively short distance during manual push through without the use of a travel rate piloted valve.

The isolation valves 126 and 130 of the brake system 400 are similar in operation and arrangement as the valves 126 and 130 of the brake system 10 with the exception that each valve 126 and 130 is in fluid communication with separate conduits 406 and 46. Preferably, the isolation valves 126 and 130 seal fluid flow in both direction when in their closed positions.

The brake system 400 further includes two pairs of check valves 410, 412 and 414, 416 for maintaining separation between the conduits 406 and 46. Preferably, redundant check valves in series are used so that double failure of the check valves 41, 412 and 414, 416 would be required before leakage from one of the conduits 406 and 46 is in fluid communication with the other of the conduits.

During a TC or VSC operation of one of the wheel brakes 48 and 50 of the brake system 400, it is preferred that both of the isolation valves 126 and 130 are energized when the pressure in the conduit 62 from the source of high pressure 60 is introduced in one of the wheel brakes 48 and 50.

Note that the brake system 400 could optionally be used with a master cylinder 12 as used in the brake systems 10 and 300 by combining the conduits 406 and 46 into a single conduit from the primary chamber.

Figure 6:
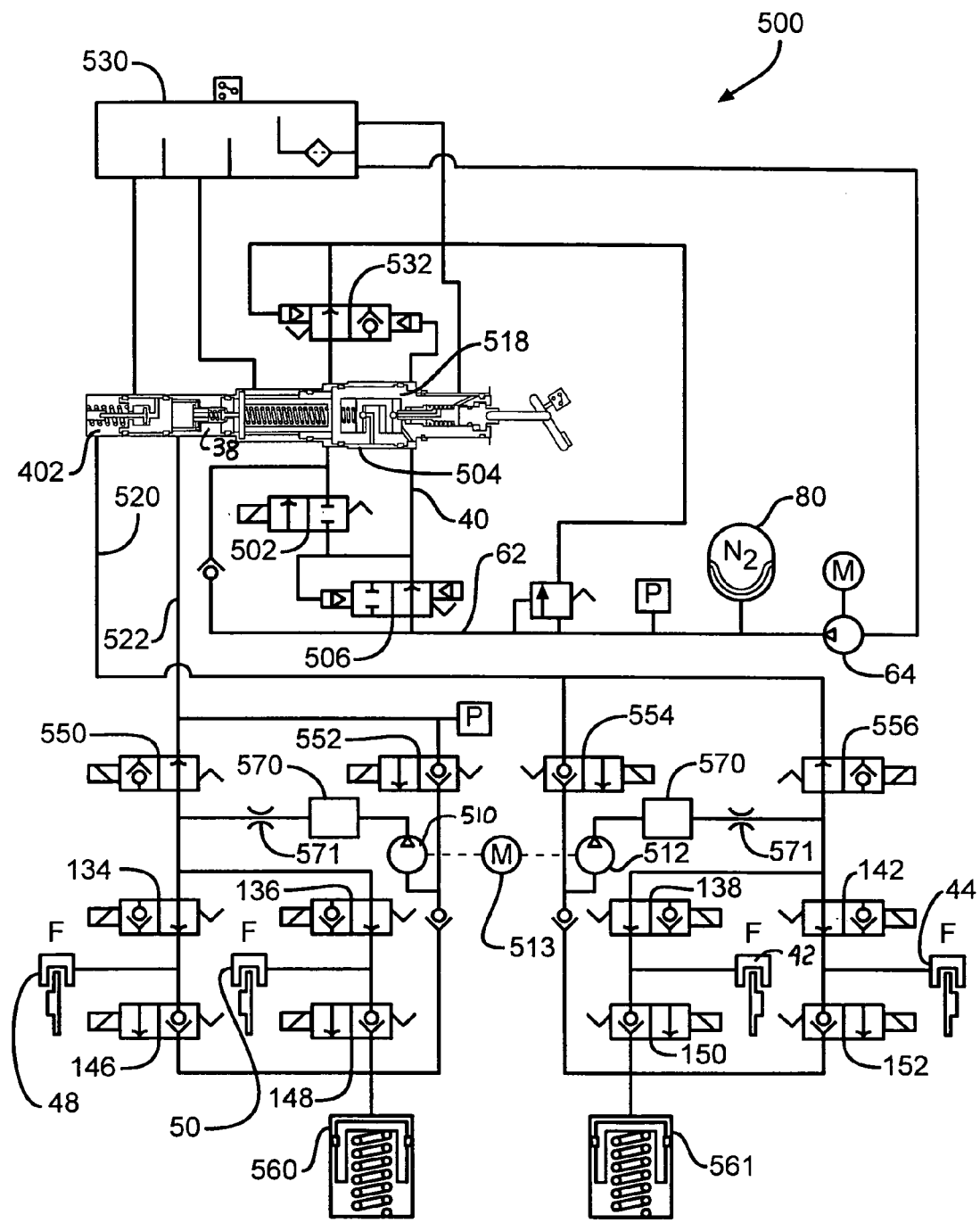
FIG. 6 is a hydraulic schematic view of a fourth embodiment of a brake system in accordance with the present invention.

There is illustrated in FIG. 6 a hydraulic schematic view of a fourth embodiment of a brake system, indicated generally at 500, in accordance with the present invention. The brake system 500 is similar in function to the brake systems discussed above and therefore, similar features, components, and operation thereof will generally not be discussed in duplicate. Similar components will include like names and reference numbers.

The brake system 500 includes apply valves 146, 148, 150 and 152, and release valves 134, 136, 138, and 142. The release valves are in fluid communication with accumulators 560 and 561. The brake system 500 further includes a pair of auxiliary pumps 510 and 512 operated by a common motor 513. 3The brake system 500 may optionally include attenuator chambers 570 and restricted orifices 571 located at the outlet of the pumps for reducing noise. The accumulators 560 and 561 are in communication with the inlets of the pumps 510 and 512. The pumps 510 and 512 provide for ABS/TC/VSC/DRP control, by supplying a source of pressure to the apply valves. The apply valves and the release valves are operated in a similar manner as described during respective ABS/TC/VSC/DRP control.

The system also includes valves 550, 552, 554, and 556 in communication between the chambers 38 and 402 of the master cylinder and the inlets and outlets of the pumps 510 and 512 to selectively permit or restrict the flow of fluid from the chambers 38 and 402.

One of the differences between the brake system 500 and the other brake systems described above is the inclusion of a solenoid actuated valve 502 which regulates the flow of fluid between a regulator valve 506 and an intermediate chamber 504. When the valve 502 is in its closed position, as shown in FIG. 6, operation of the brake system 500 under normal boosted braking is similar to the operation of the brake systems described above. Actuating the valve 502 to its open position provides a precharge function to supply sufficient pressure to prime the inlets of pumps 510 and 512 and/or pre-fill the wheel brakes when the driver is not applying the brake pedal. For applications that require considerable volumetric fluid flow, for example for larger vehicles, during TC and VSC operations with no braking, a hydraulic pre-charge is preferably generated to feed the pump supplying fluid for the TC and VSC operation by some other means to overcome head losses affecting performance.

Specifically, the pre-charge function is accomplished by actuating the valve 502 to its open position to allow fluid supplied from the regulator valve 506 via the conduit 62 and the source of high pressure (via the pump 64 and accumulator 80) to flow into an intermediate chamber 504 between a master cylinder primary piston 516 and a boost piston 518. This causes the master cylinder to be applied at low pressure to provide the pre-charge function via conduits 520 and 522. Valves 552 and 554 are preferably energized to their open positions to provide flow to the inlets of the pumps 510 and 512. Valves 550 and 556 may be energized to their one way closed positions to isolate the outlet of the pumps 510 and 512 from the chambers 38 and 402. Restricted flow is permitted back to the reservoir 530 via an orifice in the travel ratio pilot valve 532. The travel ratio pilot valve 532 operates similarly to the valve 160 in the brake system 10 described above in detail. Thus, the master cylinder can supply pressure to the VSC controllable valves while the boost piston remains in its normal returned position.

Figure 7:
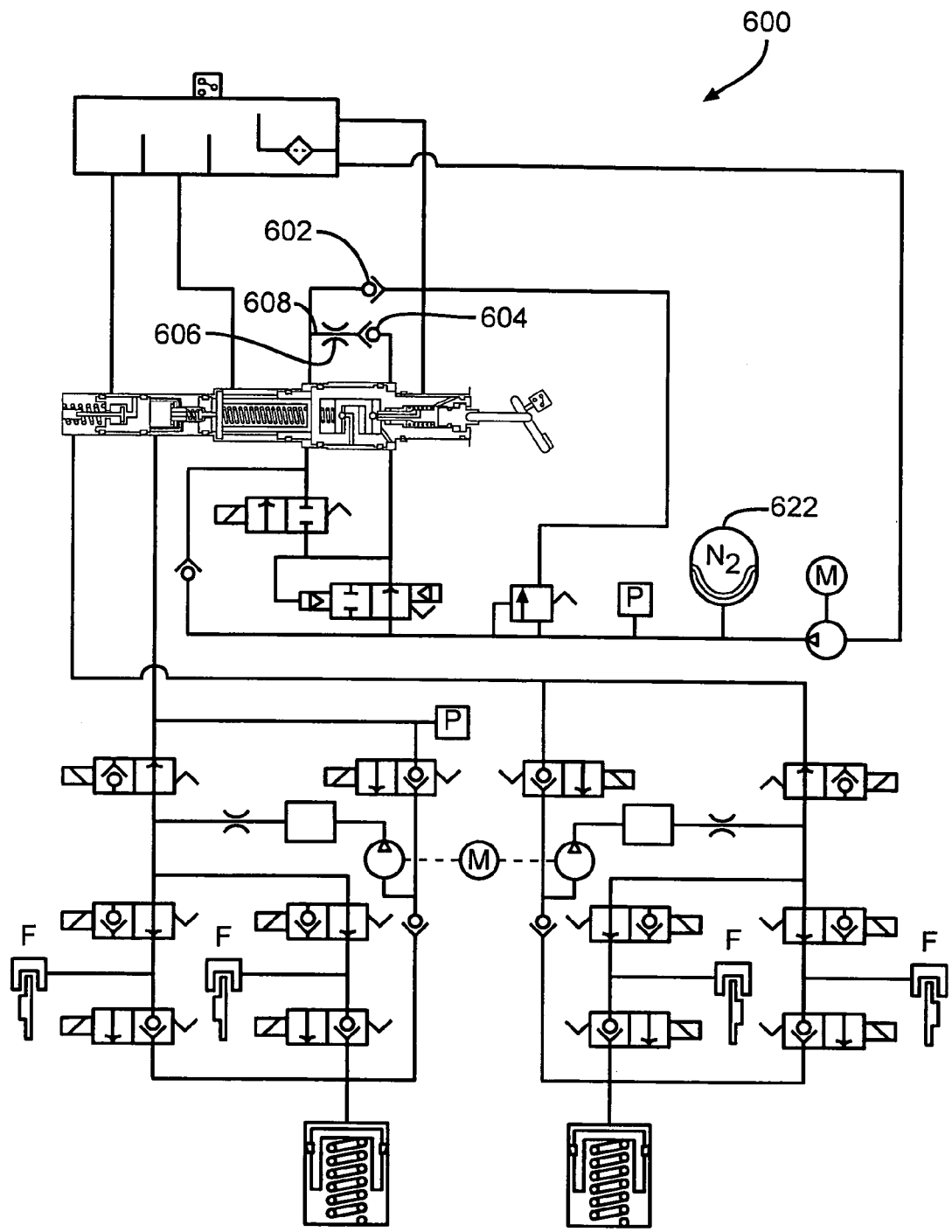
FIG. 7 is a hydraulic schematic view of a fifth embodiment of a brake system in accordance with the present invention.

There is illustrated in FIG. 7 a hydraulic schematic view of a fifth embodiment of a brake system, indicated generally at 600, which is similar in function to the brake system 500. The brake system 600 includes a pair of check valves 602 and 604 and a restricted orifice 606 in a conduit 608. The check valves 602 and 604 and the orifice 606 generally provide the same function as the travel ratio pilot valve 532. This arrangement can provide better NVH and/or durability when the solenoid valve 502 is used. A flow path from the intermediate chamber 504 to the reservoir 530 through the boost valve is provided when the driver applies the brake pedal during a VSC pre-charge event. The pressure required to fully return the pistons of the master cylinder during ABS/VSC is roughly proportional to the applied pedal force. If the travel ratio pilot valve 532 is used, the VSC system typically must force fluid from the intermediate chamber 504 into the high pressure accumulator 622 in order for the pistons of the master cylinder to fully return, unless the driver fully releases the brake pedal. Use of the dual check valves 602 and 604 and the orifice 606 arrangement, as shown in FIG. 7, generally requires that the booster be designed with somewhat higher flow capability so that the driver will not be able to collapse the intermediate chamber 504 during a spike or relatively fast brake pedal apply and experience longer than normal pedal travel.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle brake system comprising:
    a master cylinder having a housing defining a bore, said master cylinder further including a boost piston and a primary piston slidably disposed in said bore, said master cylinder having a boost chamber defined at least in part by said boost piston and said housing, said master cylinder having a primary chamber defined at least in part by said primary piston;
    a source of pressurized fluid; and
    a boost valve operable to supply fluid from said source of pressurized fluid to said boost chamber for advancing said boost piston and said primary piston in said master cylinder;
    wherein said system includes a switchable travel rate feature such that said primary piston travels at a greater rate than said boost piston during normal boosted braking when said boost valve supplies fluid from said source of pressurized fluid to said boost chamber.

2. The brake system of claim 1, wherein said boost valve is housed in said boost piston.

3. The brake system of claim 1, wherein said source of pressurized fluid provides a generally high pressure of fluid and said system further includes a pressure regulator valve for providing a limiting controlled pressure level from said source of pressurized fluid to said boost valve, wherein said pressure regulator valve is in fluid communication with said source of pressurized fluid and said boost chamber.

4. The brake system of claim 1 including a jump-in feature for providing a greater boost gain in the beginning of a braking operation, and wherein said system further includes an input mechanism including:
    a housing defining an input bore;
    an input piston slidably disposed in said input and adapted to be engageable with a brake pedal mechanism;
    a sleeve disposed in said input bore, said sleeve having a sleeve bore formed therein;
    a second piston disposed in said input bore between said input piston and said sleeve, said second piston including a passageway formed therein, said second piston having an end slidably disposed in said sleeve bore; and
    a spring biasing said second piston away from said sleeve.

5. The brake system of claim 1, wherein said master cylinder is operable to supply brake actuating pressure to first and second brake circuits, wherein said first brake circuit includes a conduit connecting said primary chamber to a first wheel brake, and wherein said second brake circuit includes a conduit connecting said boost chamber to a second wheel brake.

6. The brake system of claim 5 including a fluid separator valve connected between said first and second brake circuits.

7. The brake system of claim 5 including a plurality of valves for controlling an ABS function to at least one of said wheel brakes.

8. The brake system of claim 1, wherein upon a loss of pressure in said boost chamber, said master cylinder is adapted to provide manual push through operation such that said boost piston operatively connects with said primary piston such that said boost piston and said primary piston will travel at the same rate.

9. The brake system of claim 1, wherein said boost piston and said primary piston define different effective hydraulic areas such that said effective hydraulic area of said boost piston is greater than said primary piston.

10. The brake system of claim 9, wherein said master cylinder includes an intermediate chamber generally defined at least in part by said boost piston and said primary piston.

11. The brake system of claim 10, further including a reservoir in selective communication with said intermediate chamber via a valve, wherein operation of said valve selectively permits of prevents fluid from flowing between said intermediate chamber and said reservoir.

12. The brake system of claim 11, wherein said valve is pilot operated valve responsive to pressure differential between the fluid from said reservoir and said boost chamber.

13. The brake system of claim 3, wherein said regulator valve includes:
   a housing defining a regulator bore;
   a plunger slidably disposed in said regulator bore, wherein said plunger generally defines first and second chambers, said first chamber in communication with a high pressure chamber of said boost valve, said second chamber is in fluid communication with said boost chamber;
   a valve seat formed in said housing of said regulator valve;
   a valve member selectively engaged with said valve seat; and
   a pin extending from said plunger and operable to lift said valve member from said valve seat during movement of said plunger.

14. The brake system of claim 13, wherein said regulator valve further includes a spring biasing said plunger to reduce the volume and increase the pressure of the fluid within said first chamber.

15. The brake system of claim 4, wherein said input mechanism is housed in said boost piston.

16. A vehicle brake system comprising:
   a master cylinder having a housing defining a bore, said master cylinder further including a boost piston and a primary piston slidably disposed in said bore, said master cylinder having a boost chamber defined at least in part by said boost piston and said housing, said master cylinder having a primary chamber defined at least in part by said primary piston;
   a source of pressurized fluid providing a generally high pressure of fluid;
   a boost valve operable to supply fluid from said source of pressurized fluid to said boost chamber for advancing said boost piston and said primary piston in said master cylinder; and
   a pressure regulator valve for providing a limiting controlled pressure level from said source of pressurized fluid to said boost valve, wherein said pressure regulator valve is in fluid communication with said source of pressurized fluid and said boost chamber.

17. The brake system of claim 16, wherein said boost valve is housed in said boost piston.

18. A vehicle brake system comprising:
   a master cylinder having a housing defining a bore, said master cylinder further including a boost piston and a primary piston slidably disposed in said bore, said master cylinder having a boost chamber defined at least in part by said boost piston and said housing, said master cylinder having a primary chamber defined at least in part by said primary piston;
   a source of pressurized fluid; and
   a boost valve operable to supply fluid from said source of pressurized fluid to said boost chamber for advancing said boost piston and said primary piston in said master cylinder;
   an input mechanism for providing a greater boost gain in the beginning of a braking operation, said input mechanism including:
      a housing defining an input bore;
      an input piston slidably disposed in said input bore and adapted to be engageable with a brake pedal mechanism;
      a sleeve disposed in said input bore, said sleeve having a sleeve bore formed therein;
      a second piston disposed in said input bore between said input piston and said sleeve, said second piston including a passageway formed therein, said second piston having an end slidably disposed in said sleeve bore; and
      a spring biasing said second piston away from said sleeve.

19. The brake system of claim 16, wherein said boost valve is housed in said boost piston.

* * * * *